United States Patent
Park et al.

(10) Patent No.: US 12,525,398 B2
(45) Date of Patent: Jan. 13, 2026

(54) METHOD OF REDUCING SIZE OF DIELECTRIC PARTICLES IN DIELECTRIC SLURRY

(71) Applicant: SAMSUNG ELECTRO-MECHANICS CO., LTD., Suwon-si (KR)

(72) Inventors: Jung Jin Park, Suwon-si (KR); Su Min Kim, Suwon-si (KR); Ho Sam Choi, Suwon-si (KR); Kyu Jeong Sim, Suwon-si (KR); Jeong Ha Yoon, Suwon-si (KR); Jong Ho Lee, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 702 days.

(21) Appl. No.: 17/734,454

(22) Filed: May 2, 2022

(65) Prior Publication Data
US 2023/0170144 A1    Jun. 1, 2023

(30) Foreign Application Priority Data
Nov. 29, 2021   (KR) .................. 10-2021-0166999

(51) Int. Cl.
*H01G 4/12* (2006.01)
*C04B 35/626* (2006.01)
*H01G 4/236* (2006.01)
*H01G 4/30* (2006.01)

(52) U.S. Cl.
CPC ..... *H01G 4/1209* (2013.01); *C04B 35/62625* (2013.01); *H01G 4/236* (2013.01); *H01G 4/30* (2013.01); *H01G 4/302* (2013.01)

(58) Field of Classification Search
CPC .... C04B 2235/3206; C04B 2235/3208; C04B 2235/3215; C04B 2235/3217; C04B 2235/3224; C04B 2235/3241; H01G 13/00; H01G 4/12; H01G 4/1209; H01G 4/236; H01G 4/30; H01G 4/302
See application file for complete search history.

(56) References Cited

U.S. PATENT DOCUMENTS

2023/0170144 A1* 6/2023 Park .................. H01G 4/1209
                                                    361/301.4

FOREIGN PATENT DOCUMENTS

| CN | 116190105 A | * | 5/2023 | ........... H01G 4/1209 |
| JP | 2012-072032 A |   | 4/2012 |   |
| JP | 2020-075849 A |   | 5/2020 |   |

* cited by examiner

*Primary Examiner* — Minh N Trinh
(74) *Attorney, Agent, or Firm* — Morgan Lewis & Bockius LLP

(57) ABSTRACT

A method of manufacturing a dielectric slurry, includes supplying a dielectric slurry including dielectric particles and a solvent to a slurry supply module, dispersing the dielectric slurry by inserting the dielectric slurry into a particle dispersing module, classifying the dielectric particles according to particle size by inserting the dispersed dielectric slurry into a classifying module, recovering at least a portion of the dielectric particles to the slurry supply module, and redispersing the dielectric slurry including the dielectric particles recovered to the slurry supply module to the particle dispersing module.

15 Claims, 6 Drawing Sheets

METHOD OF REDUCING SIZE OF DIELECTRIC PARTICLES IN DIELECTRIC SLURRY

CROSS-REFERENCE TO RELATED APPLICATION(S)

This application claims benefit under 35 USC 119 (a) of Korean Patent Application No. 10-2021-0166999 filed on Nov. 29, 2021 in the Korean Intellectual Property Office, the entire disclosure of which is incorporated herein by reference for all purposes.

TECHNICAL FIELD

The present disclosure relates to a method of manufacturing a dielectric slurry and a method of manufacturing a multilayer capacitor.

BACKGROUND

A capacitor is a device capable of storing electricity, and basically, when two electrodes are opposed to each other and a voltage is applied thereto, an electrical charge is accumulated in each electrode. When a direct current (DC) voltage is applied, a current flows inside the capacitor while an electrical charge is stored, but when the accumulation is completed, the current does not flow. On the other hand, when an alternating current (AC) voltage is applied, an alternating current flows while the polarities of the electrodes change.

Depending on the type of insulator provided between the electrodes, such capacitors may be classified as one of several types, such as aluminum electrolytic capacitors including an electrode of aluminum and having a thin oxide film between the aluminum electrodes, tantalum capacitors using tantalum as an electrode material, ceramic capacitors using a dielectric with a high dielectric constant such as barium titanate, between electrodes, multilayer ceramic capacitors (MLCC) using a high-K ceramic as a dielectric material provided between the electrodes in a multilayer structure, film capacitors using a polystyrene film as a dielectric between electrodes, and the like.

In such capacitors, multilayer ceramic capacitors have the advantage of excellent temperature characteristics and frequency characteristics and may be implemented with a small size, and are thus widely applied to devices within various fields such as high-frequency circuits. The dielectric layer used in the multilayer ceramic capacitor may be manufactured by manufacturing a ceramic green sheet using a dielectric slurry, laminating the ceramic green sheet, and then sintering the same. In order to form a dielectric slurry, dielectric particles are pulverized and atomized, and conventionally, zirconium oxide ($ZrO_2$) beads have generally been used. However, when the dielectric particles are pulverized using zirconium oxide beads, a problem may occur in that the beads may be worn and a Zr component may be mixed with the dielectric particles.

SUMMARY

An aspect of the present disclosure is to provide a method of manufacturing a dielectric slurry capable of pulverizing and dispersing dielectric particles by a non-bead method. Another aspect of the present disclosure is to provide a method of manufacturing a multilayer capacitor by using the dielectric slurry obtained by the above-described manufacturing method.

According to an aspect of the present disclosure, a method of manufacturing a dielectric slurry, includes an supplying a dielectric slurry including dielectric particles and a solvent to a slurry supply module, an dispersing the dielectric slurry by inserting the dielectric slurry into a particle dispersing module, an classifying the dielectric particles according to particle size by inserting the dispersed dielectric slurry into a classifying module, an recovering at least a portion of the dielectric particles to the slurry supply module, and redispersing the dielectric slurry including the dielectric particles recovered to the slurry supply module to the particle dispersing module.

In an embodiment, the dispersing may include spraying, by the particle dispersing module, the dielectric particles to collide with each other.

In an embodiment, the particle dispersing module may be a non-beads dispersing device.

In the dispersing, portions of the particles may be directly collided with each other.

In an embodiment, in the operation of classifying the dielectric particles, particles, larger than a reference particle, among the dielectric particles may be recovered to the slurry supply module.

In an embodiment, a particle size of at least a portion of the dielectric particles recovered to the slurry supply module may be reduced by the redispersing.

In an embodiment, the classifying module may include a centrifugal separator.

In an embodiment, the classifying module may include a plurality of classifying devices.

In an embodiment, the plurality of classifying devices may include first and second classifying devices having different structures.

In an embodiment, at least a portion of the dielectric particles may be recovered from each of the first and second classifying devices to the slurry supply module.

In an embodiment, the first classifying device may include a tubular centrifugal separator.

In an embodiment, the classifying may include discharging, by the tubular centrifugal separator, particles, smaller than or equal to a reference particle, among the dielectric particles in a direction of a rotation axis of the tubular centrifugal separator.

In an embodiment, the classifying comprises laterally discharging, by the tubular centrifugal separator, particles, larger than a reference particle, among the dielectric particles.

In an embodiment, the second classifying device may include a disk-type centrifugal separator.

In an embodiment, the classifying may include laterally discharging, by the disk-type centrifugal separator, the dielectric particles.

According to another aspect of the present disclosure, a method of manufacturing a multilayer capacitor includes forming a ceramic green sheet by applying the dielectric slurry formed by the manufacturing method, applying a conductive paste on the ceramic green sheet, forming a ceramic laminate by laminating the plurality of ceramic green sheets, and sintering the ceramic laminate.

According to another aspect of the present disclosure, a method of manufacturing a dielectric slurry includes spraying, by a plurality of spraying modules, dielectric slurry including dielectric particles supplied from a slurry supply module toward each other in a particle dispersing chamber, such that portions of the dielectric slurry sprayed from the plurality of spraying modules collide in the particle dispersing chamber; classifying, according to particle size and by a classifying module, the dielectric particles from the particle dispersing chamber into at least two groups; sending one of the at least two groups of the dielectric particles, as recovered dielectric particles, to the slurry supply module; sending another of the at least two groups of the dielectric particles, as dielectric particles of the manufactured dielectric slurry, to a slurry storage; and dispersing the dielectric slurry including the recovered dielectric particles to the plurality of spraying modules.

In an embodiment, the one of the at least two groups of the dielectric particles may have a particle size greater than that of the another of the at least two groups of the dielectric particles.

In an embodiment, the classifying module may include a plurality of classifying devices.

In an embodiment, the classifying may include: laterally discharging, by the tubular centrifugal separator, particles as the one of the at least two groups of the dielectric particles, among the dielectric particles; and discharging, by a tubular centrifugal separator, the remaining particles among the dielectric particles in a direction of a rotation axis of the tubular centrifugal separator.

In an embodiment, the classifying may include laterally discharging, by the disk-type centrifugal separator, the dielectric particles.

According to another aspect of the present disclosure, a method of manufacturing a multilayer capacitor includes forming a ceramic green sheet by applying the dielectric slurry stored in the slurry storage; applying a conductive paste on the ceramic green sheet; forming a ceramic laminate by laminating the plurality of ceramic green sheets; and sintering the ceramic laminate.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
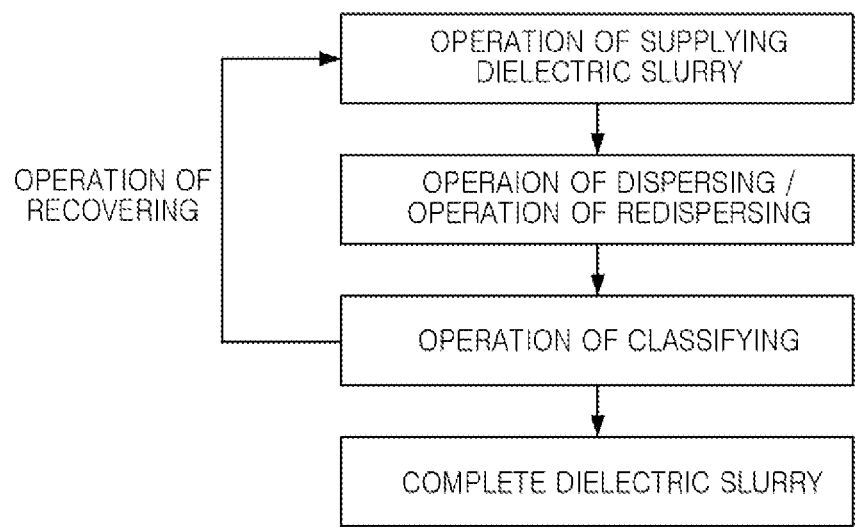
FIG. 1 is a flowchart illustrating a main process of a method of manufacturing a dielectric slurry according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Figure 2:
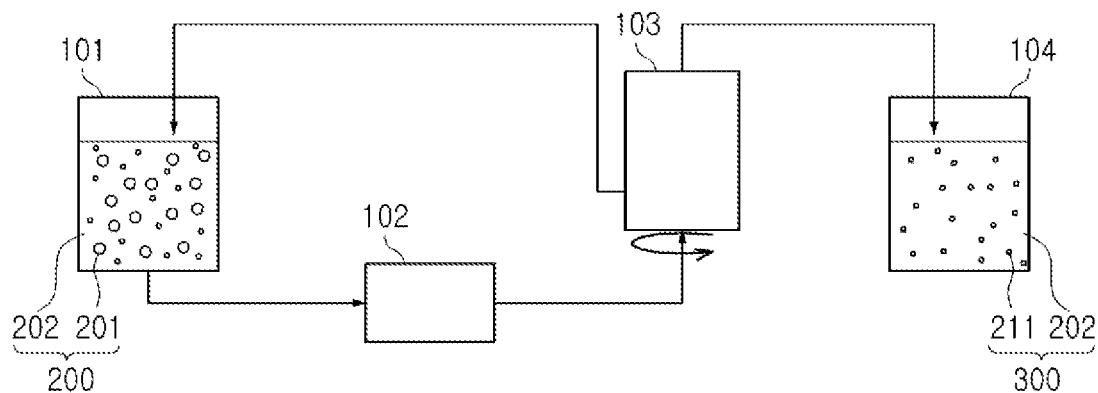
FIG. 2 schematically illustrates a device of manufacturing a dielectric slurry and a method of manufacturing a dielectric slurry.

FIG. 1 is a flowchart illustrating a main process of a method of manufacturing a dielectric slurry according to an embodiment of the present disclosure. FIG. 2 schematically illustrating a device of manufacturing a dielectric slurry and a method of manufacturing a dielectric slurry. Referring to FIG. 1, the method of manufacturing a dielectric slurry includes a dielectric slurry supply operation, a dispersion or redispersion operation, and a classification and a recovery operation, and an arrow in FIG. 1 indicates a flow of a dielectric slurry 200. In this case, although not shown separately, a pump, or the like may be added to generate a flow of the dielectric slurry 200 between each module.

Each operation of FIG. 1 will be described in detail with reference to FIG. 2. First, the operation of supplying a dielectric slurry is an operation of forming (or supplying) a dielectric slurry 200 including dielectric particles 201 and a solvent 202 in a slurry supply module 101. The dielectric particles 201 include inorganic particles, and may be, for example, ceramic particles such as barium titanate, or the like that can be used for an MLCC. The dielectric particles 201 may include particles having different sizes, and in the present embodiment, the dielectric particles 201 can be classified according to the size of the particles through a subsequent process and most of slurry storages 204 may be comprised of particles the same size as or smaller than a reference particle. As an example, the dielectric particles 201 may include particles having a diameter in a range of 10-300 nm. The solvent 202 is a liquid material capable of imparting fluidity to the dielectric particles 201, and inorganic or organic solvents that can be used in the art may be used. In addition, an organic additive that may additionally function as a dispersant may be further included to the dielectric slurry 200.

Figure 3:
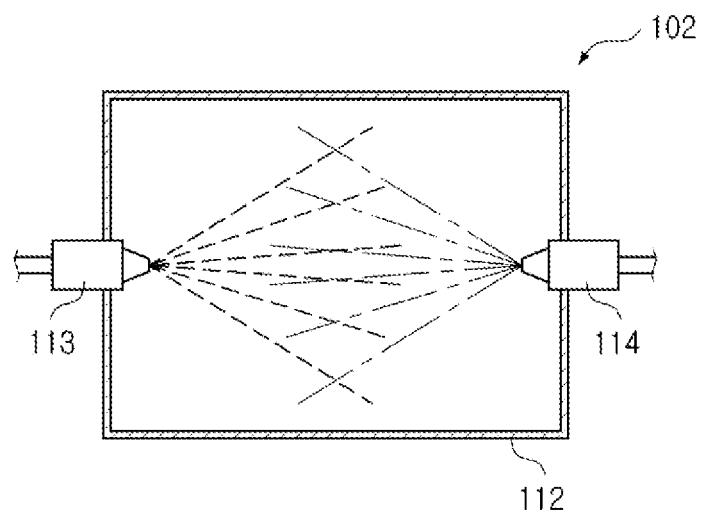
FIG. 3 is a cross-sectional view schematically illustrating a particle dispersing module that can be used in the method of manufacturing a dielectric slurry according to an embodiment of the present disclosure.

Next, the dispersing (or redispersing) operation is an operation of inserting the dielectric slurry 200 into a particle dispersing module 102 and dispersing the same. Here, the dispersing process of the particle includes an operation of pulverizing and mixing the particles. The process of redispersing the particles corresponds to a process of redispersing the particles recovered through a classifying module 103, as will be described later. In the present embodiment, the dispersion of the dielectric particle 201 corresponds to a non-beads process, that is, a pulverization process using high-pressure spraying, or the like, rather than a conventional pulverization process using beads. FIG. 3 is a cross-sectional view schematically illustrating a particle dispersing module 102 that can be used in the method of manufacturing a dielectric slurry according to an embodiment of the present disclosure. Referring to FIG. 3, the particle dispersing module 102 may be a non-bead dispersing device. As an example, the particle dispersing module 102 may include a plurality of pumps 113 and 114 as a plurality of spraying modules for spraying the dielectric slurry 200 toward an inside of the chamber 112. The plurality of bumps 113 and 114 sprays the dielectric slurry 200 toward each other in a chamber of the particle dispersing module 102 so that the dielectric particles 201 collide with each other so that impact energy is applied. In this process, the dielectric particles 201 may be pulverized into fine particles. To this end, the plurality of bumps 113 and 114 may be disposed to face each other to spray the dielectric slurry 200 at a high pressure, and a pressure range of the plurality of bumps 113 and 114 may be about 100-250 MPa. As in the present embodiment, by dispersing the dielectric slurry 200 in a non-bead process without using beads, a component of the beads, for example, a Zr component, or the like, is mixed into the dielectric particles, thereby eliminating a problem that interferes with grain growth of the dielectric particles 201.

Figure 4:
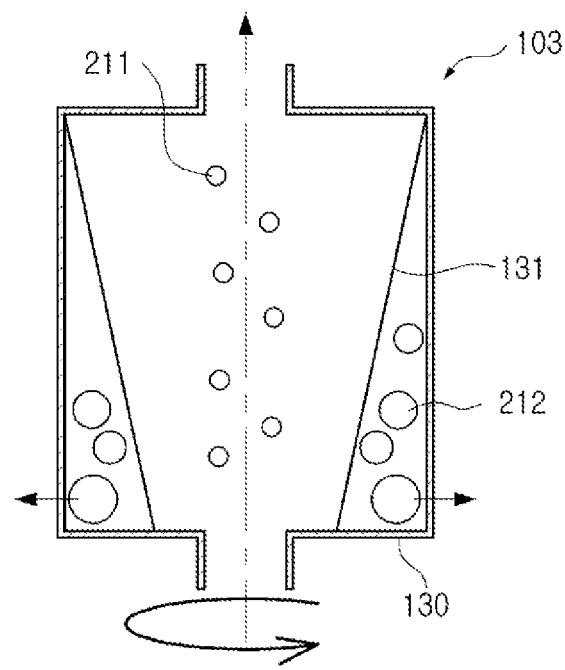
FIG. 4 is a cross-sectional view schematically illustrating an example of a classifying module.

Turing back to FIG. 2, the dielectric slurry 200, having passed through the particle dispersing module 102 is inserted into the classifying module 103. The classifying module 103 classifies the dielectric particles 201 in the dielectric slurry 200 according to particle sizes. More specifically, in the operation of classifying the dielectric particles 201, the classifying module 103 classifies particles into particles, larger than a reference particle (or a target particle) or particles, smaller than or equal to the reference particle, among the dielectric particles 201 from the dielectric slurry 200. FIG. 4 is a cross-sectional view schematically illustrating an example of the classifying module 103. As shown in the figure, the classifying module 103 may be a centrifugal separator generating motion of the dielectric particles 201 by rotation. Specifically, the classifying module 103 may include a tubular centrifuge device 130, and as the tubular centrifuge device 130 rotates along a rotation axis, particles smaller than or equal to the reference particle (a first particle 211), among the dielectric particles 201, may be discharged in a direction of the rotation axis (in an upward direction with reference to FIG. 4). The tubular centrifugal separator 130 may discharge particles, larger than a reference particle (a second particle 212), among the dielectric particles 201 in a lateral direction (in a left and right direction with reference to FIG. 4). In this way, the tubular centrifugal separator 130 may include a separator 131 for separating the first particles 211 and the second particles 212 so that the dielectric particles 201 can be classified according to particle size.

First particles 211, smaller than or equal to the reference particle, among the dielectric particles 201 may be introduced into a slurry storage 104, and may be part of the completed slurry. Since the first particles 211 are uniform and atomized in a dielectric slurry 300 stored in the slurry storage 104, when a dielectric layer for a capacitor is manufactured using the dielectric slurry 300, dispersion of electrical characteristics of the capacitor may be reduced.

After passing through the classifying module 103, at least a portion of the second particles 212 of the dielectric particles 201 are recovered to the slurry supply module 101, and the dielectric slurry 200 including the recovered dielectric particles 212 is inserted into the particle dispersing module 102 to be redistributed. Specifically, the second particles 212 larger than the reference particle, among the dielectric particles 201 may be recovered to the slurry supply module 101 without going to the slurry storage 104, and be inserted into the particle dispersing module 102 to be redispersed, thereby reducing the size thereof. In other words, the particle size of at least a portion of the dielectric particles 212 recovered to the slurry supply module 101 may be reduced by the redispersing operation. The recovered dielectric particles 212 may be mixed with dielectric particles 201 that have not yet been dispersed and included in the dielectric slurry 200. The particles 212 that have undergone the redispersion operation in this way pass through the classifying module 103 again, and if the particles 212 are smaller than or equal to the reference particle, the particles 212 may be introduced to the slurry storage 104, and if the particles 212 are larger than the reference particle, the particles 212 may be recovered to the slurry supply module 101 again. As described above, in the present embodiment, process efficiency can be improved by classifying the dielectric particles 201 by size in a continuous process and recycling only particles larger than the reference size.

Figure 5:
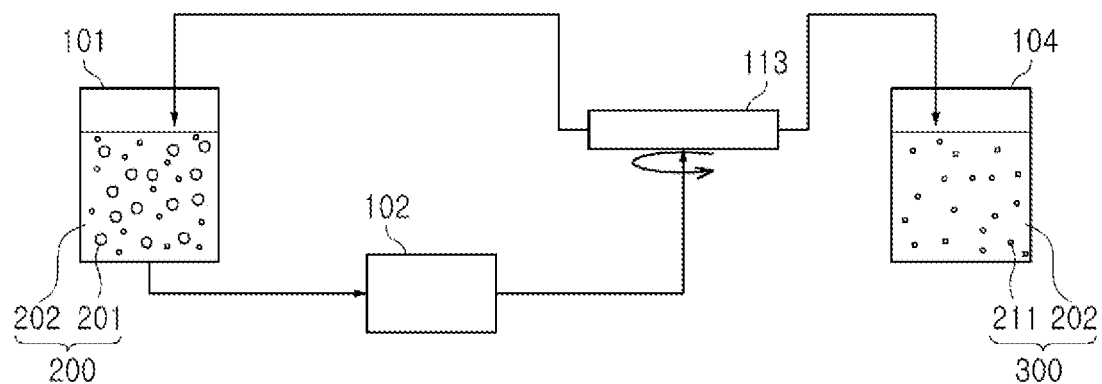
FIG. 5 schematically illustrating a device of manufacturing a dielectric slurry and a method of manufacturing a dielectric slurry according to another embodiment of the present disclosure.
Figure 6:
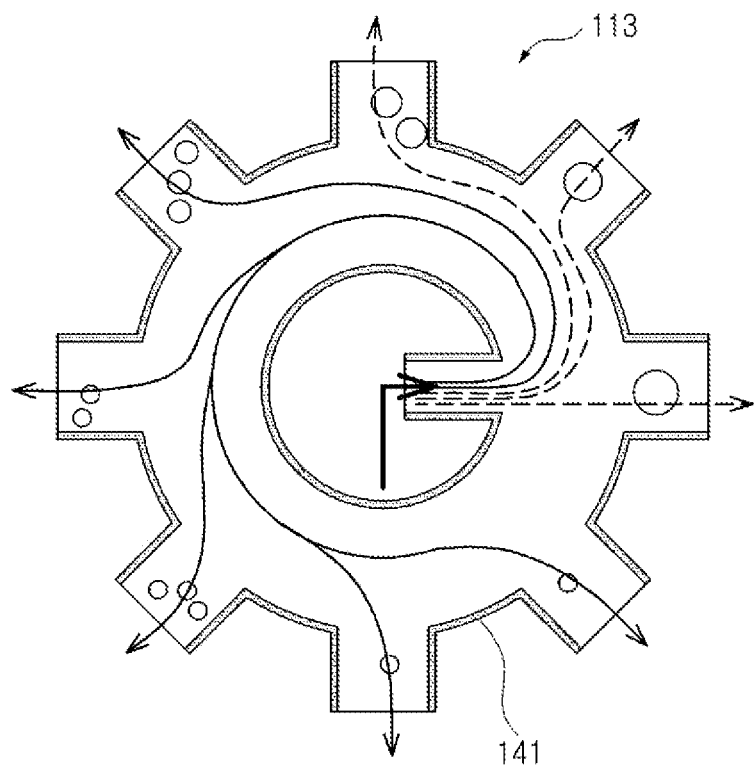
FIG. 6 is a plan view schematically illustrating an example of a disc-shaped classifying device.
Figure 7:
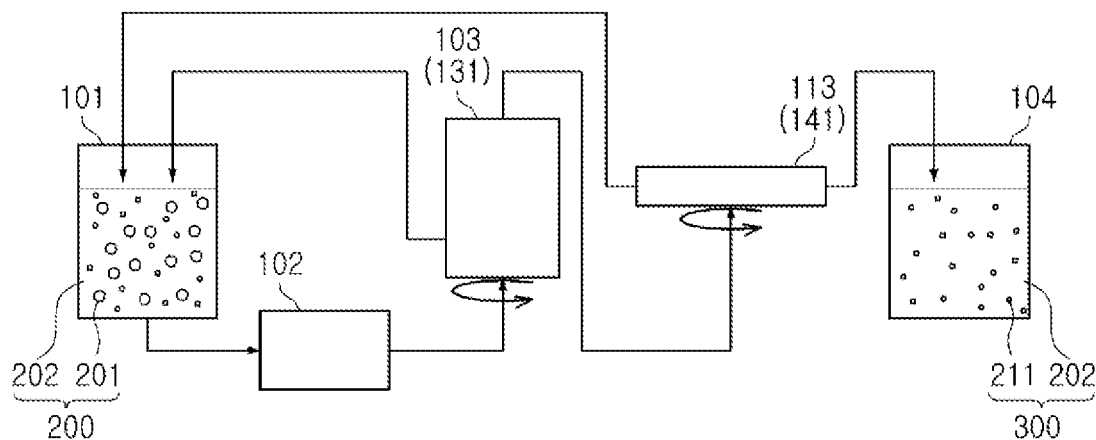
FIG. 7 schematically illustrates a device of manufacturing a dielectric slurry and a method of manufacturing a dielectric slurry according to another embodiment of the present disclosure.

FIG. 5 schematically illustrates a device of manufacturing a dielectric slurry and a method of manufacturing a dielectric slurry according to another embodiment of the present disclosure, and since there is a difference in a form of a classifying module from the previous embodiment, only this will be described. In the present embodiment, the classifying module 113 includes a disk-shaped centrifugal separator 141, and a specific example is shown in FIG. 6. The disk-type centrifugal separator 141 may separate particles using a difference between inertia flow force and centrifugal force, and the dielectric particles 201 may be discharged in a lateral direction. Here, the lateral direction is based on FIG. 5 and corresponds to a discharge direction of the particles indicated by arrows in FIG. 6. In the disk-type centrifugal separator 141, a dotted arrow indicates a path of particles recovered to the slurry supply module 101, and a solid arrow indicates a path of particles input to the slurry storage 104. In the case of the disk-shaped centrifugal separator 141, a size difference of the dielectric particles 201 is suitable for classification using a difference in the mass of the particles at a level of 100 nm or less. In the case of the above-described tubular centrifugal separator 131, the size difference of the dielectric particles 201 is suitable for classification using a difference in the mass of the particles at a level of 100 nm or more. In this case, as illustrated in FIG. 7, the classifying modules 103 and 113 may include a plurality of classifying devices, for example, first and second classifying devices 131 and 141 having different structures. In this case, the first classifying device 131 may be a tubular centrifugal separator, and the second classifying device 141 may be a disk-shaped centrifugal separator. At least a portion of the dielectric particles 201 may be recovered from each of the first and second classifying devices 131 and 141 to the slurry supply module 101 as illustrated. Classification accuracy can be further improved by connecting and using the classifying devices 131 and 141 having different structures as in the embodiment of FIG. 7, however, an order in which the first and second classifying devices 131 and 141 are connected may be changed. That is, the second classifying device classifying device 141 may be disposed in front of the first classifying device 131.

Figure 8:
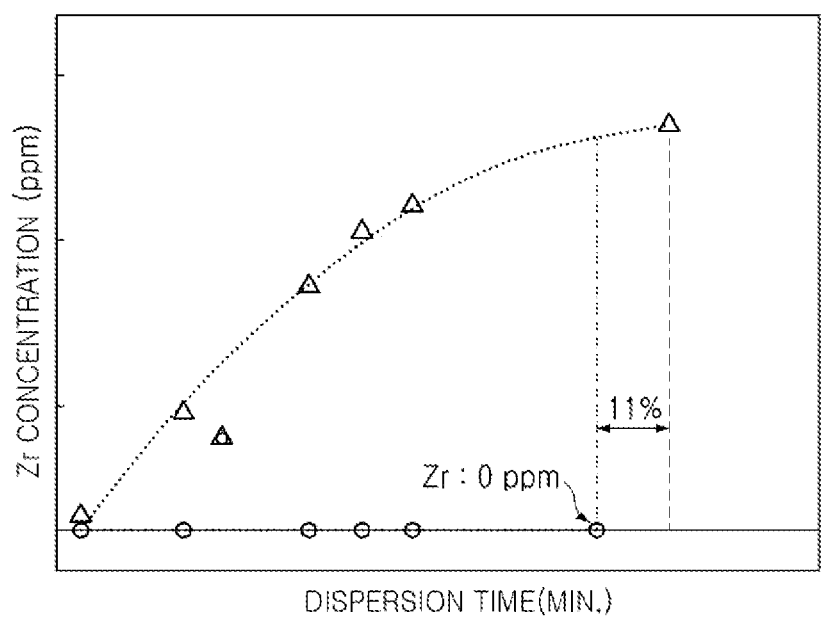
FIGS. 8 and 9 are graphs illustrating experimental results for Examples and Comparative Examples of the present disclosure.
Figure 9:
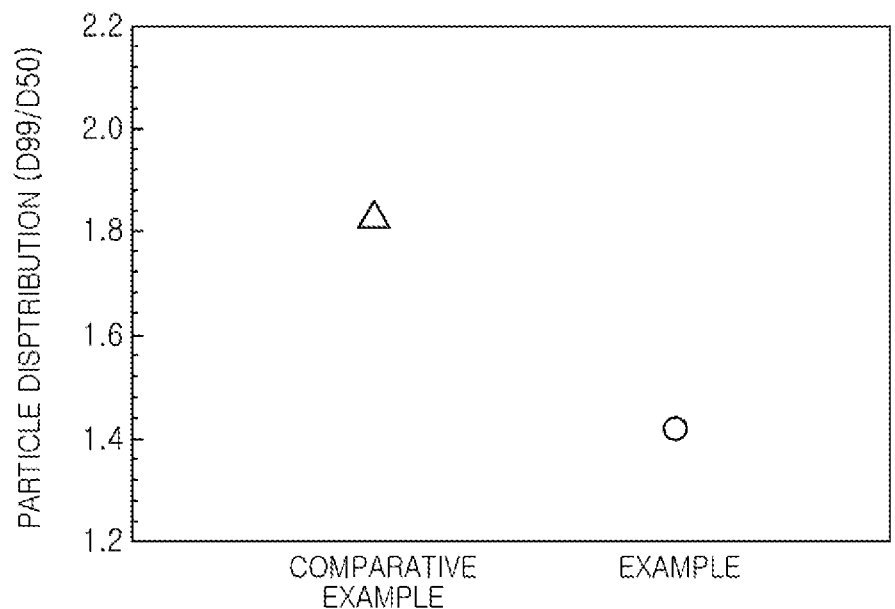

The inventors of the present disclosure obtained a dielectric slurry by the above-described manufacturing method, and then conducted an experiment to compare the characteristics thereof with that of a dielectric slurry obtained by a conventional manufacturing method, and the results thereof were shown in FIGS. 8 and 9. In FIGS. 8 and 9, circles indicate Examples of the present disclosure, and triangles indicate Comparative examples pulverized with $ZrO_2$ beads. First, FIG. 8 illustrates a result of measuring a change in concentration of Zr in dielectric particles according to a dispersion time, where the dispersion time corresponds to a time when the dielectric particles satisfy a target particle size condition. As can be seen from the results shown in FIG. 8, in the Example, the dispersion time was reduced to a level of 11% compared to that of the Comparative Example, and unintentional mixing of Zr was hardly found. In addition, looking at a result of measuring particle distribution (D99/D50) of FIG. 9, it can be seen that the particle distribution is significantly improved in the Example, which is understood because it undergoes a process of filtering and recovering, and redispersing particles larger than the target value.

Figure 10:
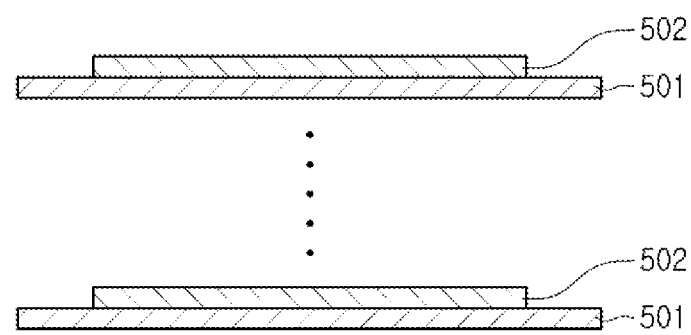
FIGS. 10 to 12 are process diagrams illustrating a process of manufacturing a multilayer capacitor using a dielectric slurry.

Hereinafter, a process of forming a multilayer capacitor from the dielectric slurry obtained by the above-described manufacturing method will be described. First, referring to FIG. 10, a ceramic green sheet 501 is formed by applying a dielectric slurry, and a conductive paste 502 is applied thereon. The application of the ceramic green sheet 501 may be performed by a suitable printing process by using the dielectric slurry obtained by the above-described manufacturing method. In this case, a metal oxide additive, for example, at least one of $MnO_2$, $Dy_2O_3$, $BaO$, $MgO$, $Al_2O_3$, $SiO_2$, $Cr_2O_3$, and $CaCO_3$ may be added to the dielectric slurry, as needed. The conductive paste 502 is used as an internal electrode of the multilayer capacitor and may include metal particles including Ni, Ag, Cu, Ti, Pd, and the like, a glass component, and the like.

Figure 11:
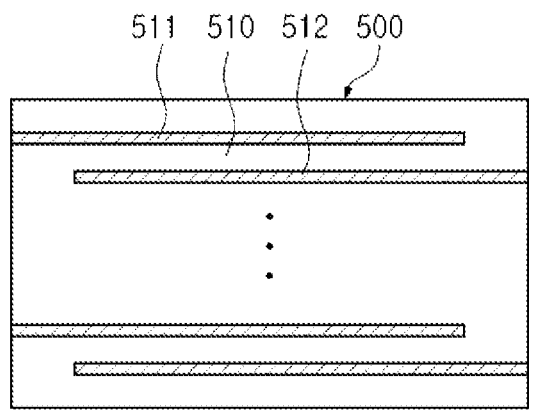

Then, as shown in FIG. 11, a plurality of ceramic green sheets 501 coated with a conductive paste 502 are laminated to form a ceramic laminate 500. FIG. 11 illustrates a state in which the ceramic green sheet 501 is diced in units of stacked individual elements. Internal electrode patterns 511 and 512 formed of the conductive paste 502 by the dicing process may be exposed externally of the ceramic laminate 500, and a dielectric layer 510 formed by the ceramic green sheet 501 may be formed between the internal electrodes 511 and 512.

Figure 12:
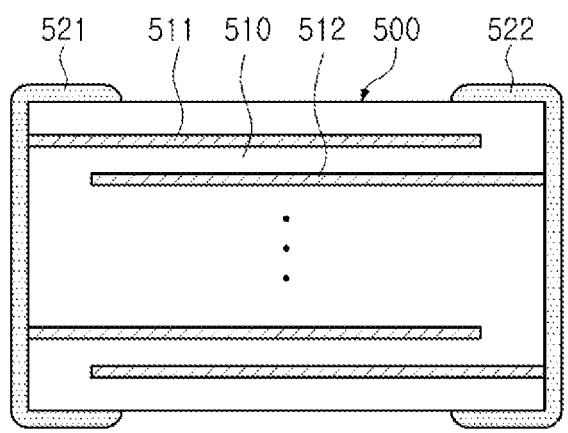

Thereafter, as shown in FIG. 12, external electrodes 521 and 522 are formed in the ceramic laminate 500 to be connected to the internal electrode patterns 511 and 512. Thereafter, the ceramic laminate 500 is sintered, and in this process, the external electrodes 521 and 522 may also be sintered. However, alternatively, the external electrodes 521 and 522 may be formed after sintering the ceramic laminate 500.

As set forth above, according to a method of manufacturing a dielectric slurry according to an example of the present disclosure, dielectric particles may be pulverized and dispersed using a non-beads method, and the dielectric particles may be effectively classified by size. In addition, when a multilayer capacitor is manufactured using the dielectric slurry obtained in this method, dispersion of electrical characteristics may be reduced.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of reducing dielectric particles in a dielectric slurry, comprising:
supplying the dielectric slurry including the dielectric particles and a solvent to a slurry supply module;
dispersing a portion of the dielectric slurry from the slurry supply module to a classifying module by a particle dispersing module;
classifying dielectric particles included in the portion of the dielectric slurry dispersed from the slurry supply module according to particle sizes and by the classifying module;
recovering a portion of the dielectric slurry in the classifying module including dielectric particles having a first size greater than a second size of dielectric particles included in another portion of the dielectric slurry in the classifying module, from the classifying module back to the slurry supply module, and sending the another portion of the dielectric slurry from the classifying module to a slurry storage; and
redispersing the dielectric slurry including the dielectric particles recovered to the slurry supply module to the classifying module by the particle dispersing module,
wherein the dispersing comprises a step of spraying the dielectric particles to collide with each other by the particle dispersing module.

2. The method of claim 1, wherein the classifying module includes a centrifugal separator.

3. The method of claim 1, wherein the particle dispersing module is a non-beads dispersion device.

4. The method of claim 1, wherein in the dispersing, portions of the particles are directly collided with each other.

5. The method of claim 1, wherein, in the classifying the dielectric particles, particles, larger than a reference particle, among the dielectric particles are recovered to the slurry supply module.

6. The method of claim 5, wherein at least a portion of the dielectric particles recovered to the slurry supply module are reduced in particle size by the redispersing.

7. The method of claim 1, wherein the classifying module comprises a plurality of classifying devices.

8. The method of claim 7, wherein the plurality of classifying devices comprise first and second classifying devices having different structures.

9. The method of claim 8, wherein at least a portion of the dielectric particles are recovered from each of the first and second classifying devices to the slurry supply module.

10. The method of claim 8, wherein the first classifying device includes a tubular centrifugal separator.

11. The method of claim 10, wherein the classifying comprises discharging particles, smaller than or equal to a reference particle, among the dielectric particles in a direction of a rotation axis of the tubular centrifugal separator by the tubular centrifugal separator.

12. The method of claim 11, wherein the classifying comprises laterally discharging particles, larger than a reference particle, among the dielectric particles by the tubular centrifugal separator.

13. The method of claim 8, wherein the second classifying device includes a disk-type centrifugal separator.

14. The method of claim 13, wherein the classifying comprises laterally discharging dielectric particles by the disk-type centrifugal separator.

15. A method of manufacturing a multilayer capacitor, comprising:
forming a ceramic green sheet by applying a dielectric slurry including dielectric particles;
applying a conductive paste on the ceramic green sheet;
forming a ceramic laminate by laminating the plurality of ceramic green sheets; and
sintering the ceramic laminate,
wherein forming the ceramic green sheet includes a method of reducing the dielectric particles in the dielectric slurry, comprising:
supplying the dielectric slurry including the dielectric particles and a solvent to a slurry supply module;
dispersing a portion of the dielectric slurry from the slurry supply module to a classifying module by a particle dispersing module;
classifying dielectric particles included in the portion of the dielectric slurry dispersed from the slurry supply module according to particle sizes and by the classifying module;
recovering a portion of the dielectric slurry in the classifying module including dielectric particles having a first size greater than a second size of dielectric particles included in another portion of the dielectric slurry in the classifying module, from the classifying module back to the slurry supply module, and sending the another portion of the dielectric slurry from the classifying module to a slurry storage; and
redispersing the dielectric slurry including the dielectric particles recovered to the slurry supply module to the classifying module by the particle dispersing module,
wherein the dispersing comprises a step of spraying the dielectric particles to collide with each other by the particle dispersing module.

* * * * *